(12) United States Patent
Vinciarelli et al.

(10) Patent No.: US 7,944,273 B1
(45) Date of Patent: May 17, 2011

(54) ACTIVE FILTERING

(75) Inventors: Patrizio Vinciarelli, Boston, MA (US); Michael Briere, Manhattan Beach, CA (US); Jeffrey Gordon Dumas, West Warwick, RI (US)

(73) Assignee: Picor Corporation, North Smithfield, RI (US)

( * ) Notice: Subject to any disclaimer, the term of this patent is extended or adjusted under 35 U.S.C. 154(b) by 0 days.

(21) Appl. No.: 12/143,364

(22) Filed: Jun. 20, 2008

Related U.S. Application Data

(60) Division of application No. 10/897,537, filed on Jul. 23, 2004, now Pat. No. 7,443,229, which is a continuation-in-part of application No. 10/663,364, filed on Sep. 15, 2003, now abandoned, which is a continuation-in-part of application No. 10/377,087, filed on Feb. 28, 2003, now abandoned, which is a continuation-in-part of application No. 09/841,471, filed on Apr. 24, 2001, now Pat. No. 6,985,341.

(51) Int. Cl.
*H01J 19/82* (2006.01)
(52) U.S. Cl. .................. 327/531; 327/532
(58) Field of Classification Search .......... 327/530–532, 327/551; 323/281–285; 361/18
See application file for complete search history.

(56) References Cited

U.S. PATENT DOCUMENTS

| | | | |
|---|---|---|---|
| 2,622,780 A | 12/1952 | Ackerman | |
| 3,071,854 A | 1/1963 | Pighini | |
| 3,305,767 A | 2/1967 | Beihl et al. | |
| 3,391,547 A | 7/1968 | Kingston | |
| 3,429,040 A | 2/1969 | Miller | |
| 3,520,337 A | 7/1970 | Irland et al. | |
| 3,621,338 A | 11/1971 | Rogers et al. | |
| 3,638,103 A | 1/1972 | Birchenough | |
| 3,683,241 A | 8/1972 | Duncan | |
| 3,737,729 A | 6/1973 | Carney | |
| 3,766,440 A | 10/1973 | Baird | |
| 3,769,702 A | 11/1973 | Scarbrough | |
| 3,900,770 A | 8/1975 | Kaufman | |
| 3,986,101 A * | 10/1976 | Koetsch et al. | ............... 323/275 |
| 4,156,148 A | 5/1979 | Kaufman | |
| 4,196,411 A | 4/1980 | Kaufman | |
| 4,215,235 A | 7/1980 | Kaufman | |
| 4,218,724 A | 8/1980 | Kaufman | |
| 4,250,481 A | 2/1981 | Kaufman | |
| 4,257,091 A | 3/1981 | Kaufman | |
| 4,266,140 A | 5/1981 | Kaufman | |
| 4,267,866 A | 5/1981 | Larsson et al. | |

(Continued)

FOREIGN PATENT DOCUMENTS

CA 2133392 4/1995

(Continued)

OTHER PUBLICATIONS

Gates and Yokoro, "Sealed Chip-On-Board Circuit Protector"; $3^{rd}$ International SAMPE Electronics Conferecne; Jun. 20-22, 1989; pp. 929-938.

(Continued)

*Primary Examiner* — Dinh T. Le
(74) *Attorney, Agent, or Firm* — Fish & Richardson P.C.

(57) ABSTRACT

Techniques for adjusting the voltage across an active filter element include a controlled circuit element and a control circuit element adapted to control the voltage across the controlled circuit element to increase transient load response and to reduce power dissipation.

13 Claims, 10 Drawing Sheets

U.S. PATENT DOCUMENTS

| | | | |
|---|---|---|---|
| 4,278,990 A | 7/1981 | Fichot | |
| 4,315,175 A | 2/1982 | Hamilton | |
| 4,394,530 A | 7/1983 | Kaufman | |
| 4,400,762 A | 8/1983 | Bartley et al. | |
| 4,417,296 A | 11/1983 | Schelhorn | |
| 4,446,896 A | 5/1984 | Campagna | |
| 4,449,165 A | 5/1984 | Kaufman | |
| 4,449,292 A | 5/1984 | Kaufman | |
| 4,488,202 A | 12/1984 | Kaufman | |
| 4,498,120 A | 2/1985 | Kaufman | |
| 4,531,145 A | 7/1985 | Wiech, Jr. | |
| 4,546,410 A | 10/1985 | Kaufman | |
| 4,546,411 A | 10/1985 | Kaufman | |
| 4,551,746 A | 11/1985 | Gilbert et al. | |
| 4,551,747 A | 11/1985 | Gilbert et al. | |
| 4,554,613 A | 11/1985 | Kaufman | |
| 4,574,162 A | 3/1986 | Kaufman | |
| 4,577,387 A | 3/1986 | Kaufman | |
| 4,648,432 A | 3/1987 | Mechalas | |
| 4,649,461 A | 3/1987 | Matsuta | |
| 4,650,107 A | 3/1987 | Keser | |
| 4,691,265 A | 9/1987 | Calver et al. | |
| 4,724,283 A | 2/1988 | Shimada et al. | |
| 4,724,514 A | 2/1988 | Kaufman | |
| 4,736,520 A | 4/1988 | Morris | |
| 4,740,414 A | 4/1988 | Shaheen | |
| 4,750,089 A | 6/1988 | Derryberry et al. | |
| 4,750,092 A | 6/1988 | Werther | |
| 4,769,525 A | 9/1988 | Leatham | |
| 4,774,634 A | 9/1988 | Tate et al. | |
| 4,783,695 A | 11/1988 | Eichelberger et al. | |
| 4,783,697 A | 11/1988 | Benenati et al. | |
| 4,793,543 A | 12/1988 | Gainey et al. | |
| 4,823,235 A | 4/1989 | Suzuki et al. | |
| 4,840,286 A | 6/1989 | Heberling et al. | |
| 4,847,136 A | 7/1989 | Lo | |
| 4,872,081 A | 10/1989 | Murphy et al. | |
| 4,879,630 A | 11/1989 | Boucard et al. | |
| 4,880,039 A | 11/1989 | Horak | |
| 4,899,257 A | 2/1990 | Yamamoto | |
| 4,918,811 A | 4/1990 | Eichelberger et al. | |
| 4,920,309 A * | 4/1990 | Szepesi | 323/269 |
| 4,953,005 A | 8/1990 | Carlson et al. | |
| 4,983,905 A | 1/1991 | Sano et al. | |
| 4,985,097 A | 1/1991 | Matsumura et al. | |
| 4,990,490 A | 2/1991 | Pathare et al. | |
| 4,994,215 A | 2/1991 | Wiech, Jr. | |
| 4,996,116 A | 2/1991 | Webster et al. | |
| 5,001,603 A | 3/1991 | Villaneuva, III et al. | |
| 5,006,673 A | 4/1991 | Freyman et al. | |
| 5,009,618 A | 4/1991 | Black et al. | |
| 5,019,941 A | 5/1991 | Craft | |
| 5,019,946 A | 5/1991 | Eichelberger et al. | |
| 5,028,987 A | 7/1991 | Neugebauer et al. | |
| 5,111,362 A | 5/1992 | Flamm et al. | |
| 5,148,841 A | 9/1992 | Graffin | |
| 5,176,309 A | 1/1993 | Horiguchi et al. | |
| 5,182,545 A | 1/1993 | Goekler et al. | |
| 5,206,986 A | 5/1993 | Arai et al. | |
| 5,216,279 A | 6/1993 | Nakao | |
| 5,258,888 A | 11/1993 | Korinsky | |
| 5,271,548 A | 12/1993 | Maiwald | |
| 5,280,850 A | 1/1994 | Horiguchi et al. | |
| 5,296,735 A | 3/1994 | Fukunaga | |
| 5,321,373 A | 6/1994 | Shusterman | |
| 5,324,890 A | 6/1994 | Lawlyes | |
| 5,328,751 A | 7/1994 | Komorita et al. | |
| 5,365,403 A | 11/1994 | Vinciarelli et al. | |
| 5,372,295 A | 12/1994 | Abe et al. | |
| 5,375,322 A | 12/1994 | Leeb | |
| 5,408,173 A | 4/1995 | Knapp | |
| 5,447,267 A | 9/1995 | Sakai et al. | |
| 5,470,343 A | 11/1995 | Fincke et al. | |
| 5,485,077 A | 1/1996 | Werrbach | |
| 5,526,234 A | 6/1996 | Vinciarelli et al. | |
| 5,563,501 A | 10/1996 | Chan | |
| 5,644,103 A | 7/1997 | Pullen et al. | |
| 5,663,869 A | 9/1997 | Vinciarelli et al. | |
| 5,686,821 A | 11/1997 | Brokaw | |
| 5,720,324 A | 2/1998 | Vinciarelli | |
| 5,722,467 A | 3/1998 | Vinciarelli | |
| 5,734,259 A | 3/1998 | Sisson et al. | |
| 5,777,462 A | 7/1998 | Yue | |
| 5,778,526 A | 7/1998 | Vinciarelli et al. | |
| 5,781,390 A | 7/1998 | Notaro et al. | |
| 5,804,859 A | 9/1998 | Takahashi et al. | |
| 5,808,358 A | 9/1998 | Vinciarelli et al. | |
| 5,831,842 A | 11/1998 | Ogasawara et al. | |
| 5,876,859 A | 3/1999 | Saxelby, Jr. et al. | |
| 5,906,310 A | 5/1999 | Vinciarelli et al. | |
| 5,911,356 A | 6/1999 | Tsurusaki | |
| 5,929,510 A | 7/1999 | Geller et al. | |
| 5,939,867 A | 8/1999 | Capici et al. | |
| 5,945,816 A | 8/1999 | Marusik | |
| 6,137,267 A | 10/2000 | Kates et al. | |
| 6,154,090 A * | 11/2000 | Wissmach et al. | 327/552 |
| 6,232,755 B1 | 5/2001 | Zhang | |
| 6,236,194 B1 | 5/2001 | Manabe et al. | |
| 6,269,011 B1 | 7/2001 | Ohshima | |
| 6,313,690 B1 | 11/2001 | Ohshima | |
| 6,369,555 B2 | 4/2002 | Rincon-Mora | |
| 6,489,755 B1 | 12/2002 | Boudreaux et al. | |
| 6,525,596 B2 | 2/2003 | Hosono et al. | |
| 6,642,672 B2 | 11/2003 | Hu et al. | |
| 6,775,157 B2 | 8/2004 | Honda | |
| 6,985,341 B2 | 1/2006 | Vinciarelli et al. | |
| 7,304,462 B2 * | 12/2007 | Shvarts | 323/284 |
| 7,443,229 B1 | 10/2008 | Vinciarelli et al. | |
| 2001/0045863 A1 | 11/2001 | Pelly | |

FOREIGN PATENT DOCUMENTS

| | | |
|---|---|---|
| CH | 491 733 | 7/1970 |
| DE | 1 127 179 | 4/1962 |
| DE | 28 40 514 | 3/1979 |
| DE | 33 23 604 | 1/1985 |
| DE | 38 04 674 A1 | 8/1989 |
| DE | 9100467 | 5/1992 |
| DE | 9217155.9 | 2/1993 |
| EP | 0 141 531 | 5/1985 |
| EP | 0 141 582 | 5/1985 |
| EP | 0 264 122 A1 | 4/1988 |
| EP | 0 577 484 A1 | 1/1994 |
| EP | 1 028 511 | 8/2000 |
| FR | 2 302 179 | 9/1976 |
| FR | 2 738 086 | 2/1997 |
| GB | 2 241 465 A | 9/1991 |
| GB | 2 248 345 | 4/1992 |
| JP | 50-103452 | 8/1975 |
| JP | 51-9459 | 3/1976 |
| JP | 52-11769 | 1/1977 |
| JP | 54-08462 | 1/1979 |
| JP | 56-001312 | 6/1979 |
| JP | 57-53948 | 3/1982 |
| JP | 57-190768 | 11/1982 |
| JP | 59-9014 | 1/1984 |
| JP | 59-9015 | 1/1984 |
| JP | 59-170915 | 9/1984 |
| JP | 60-260192 | 12/1985 |
| JP | 61-156791 | 7/1986 |
| JP | 61-177762 | 8/1986 |
| JP | 63-119242 | 5/1988 |
| JP | 63-114095 | 7/1988 |
| JP | 63-2733798 | 11/1988 |
| JP | 1-161892 | 6/1989 |
| JP | 1-267009 A | 10/1989 |
| JP | 02-077138 | 3/1990 |
| JP | 2-192792 | 7/1990 |
| JP | 4-500432 | 1/1992 |
| JP | 4-83367 | 3/1992 |
| JP | 4-287396 | 10/1992 |
| JP | 4-346260 | 12/1992 |
| JP | 5-129515 | 5/1993 |
| JP | 5-347475 | 12/1993 |
| JP | 6-23534 | 2/1994 |
| JP | 6-48851 | 2/1994 |
| JP | 6-90083 | 3/1994 |
| JP | 7-202475 | 8/1995 |

| | | |
|---|---|---|
| JP | 7-254781 | 10/1995 |
| JP | 08-308093 | 11/1996 |
| JP | 09-008075 | 1/1997 |
| JP | 11-289690 | 10/1999 |
| JP | 03-293924 | 12/1999 |
| JP | 2000-269403 | 9/2000 |
| JP | 2000-299927 | 10/2000 |
| WO | WO 90/15709 | 12/1990 |
| WO | WO 94/03038 | 2/1994 |

OTHER PUBLICATIONS

Julian et al., "Active Filtering for Common Mode Conducted EMI Reduction in Voltage Source Inverters", (*APEC Thirteenth Annual Applied Power Electronics Conference and Exposition*), *Sponsored by IEEE Power Electronics Society; IEEE Industry Applications Society Power Sources Manufacturers Association*, vol. 2, pp. 934-939 (1998).

LaWhite et al., "Active Filters for 1-MHz Power Circuits with Strict Input/Output Ripple Requirements", *IEEE Transactions on Power Electronics*, vol. PE-2:4, pp. 282-290 (1987).

LaWhite et al., "Design of Active Ripple Filters for Power Circuits Operating in the 1-10 MHz Range", *IEEE Transactions on Power Electronics*, vol. 3:3, pp. 310-317 (1988).

LaWhite, "Active Filters for 1MHz Power Circuits Under Strict Ripple Limitations", *MS Thesis, Massachusetts Institute of Technology*, pp. 1-99 (Feb. 1987).

Ogasawara et al., "An Active Circuit for Cancellation of Common-Mode Voltage Generated by a PWM Inverter", *IEEE Transactions on Power Electronics*, vol. 13:5, pp. 835-841 (1998).

Ott, Henry W., "Noise Reduction Techniques in Electronic Systems", $2^{nd}$ Edition, Published by John Wiley & Sons, Inc., Table of Contents (8 pages) (1936).

Poon et al., "Techniques for Input Ripple Current Cancellation: Classification and Implementation", *IEEE Transactions on Power Electronics*, vol. 15:6, pp. 1144-1152 (2000).

Saxelby, Direct Metal Bonding, U.S. Appl. No. 08/336,994, filed Nov. 10, 1994 (U.S. 5,876,859, issued Mar. 2, 1999).

Sevgin Oktay, High Heat From a Small Package, Mechanical Engineering, Mar. 1986, pp. 36-42.

Son et al., "A Novel Active Common-mode EMI Filter for PWM Inverter", *IEEE*, pp. 545-549 (2002).

Tummala, Microelectronics Packaging Handbook, Van Nostrand 1989, pp. 212-214.

"IBM Technical Disclosure Bulletin," Aug. 1971, 3 pages.

"LM195/LM395 Ultra Reliable Power Transistors," 2000 National Semiconductor Corporation, Jul. 2000, 13 pages.

"Fast IC Power Transistor with Thermal Protection," 2002 National Semiconductor Corporation, Application Note 110, Apr. 1998, 9 pages.

"TPS2010, TPS2011, TPS2012, TPS2013 Power-Distribution," Texas Instruments, Dec. 1994—Revised Aug. 1995, 17 pages.

"Add Kelvin Sensing and Parallel Capability to 3-Terminal Regulators," 2002 National Semiconductor Corporation, Linear Brief 51, Mar. 1981, 2 pages.

Notice of Reason for Rejection received from Japanese Patent Office for App. Serial No. 2002-122735, dated Mar. 5, 2007, 6 pages.

* cited by examiner

US 7,944,273 B1

ACTIVE FILTERING

PRIORITY CLAIM

This application is a divisional of U.S. application Ser. No. 10/897,537 filed on Jul. 23, 2004, now U.S. Pat. No. 7,443, 229, which is a continuation-in-part of U.S. application Ser. No. 09/841,471 filed on Apr. 24, 2001, now U.S. Pat. No. 6,985,341; U.S. application Ser. No. 10/377,087 filed on Feb. 28, 2003, now abandoned; and U.S. application Ser. No. 10/663,364, filed on Sep. 15, 2003, now abandoned. U.S. application Ser. Nos. 10/897,537, 10/377,087, and 10/663, 364 are all incorporated herein by reference.

BACKGROUND

Electronic circuits may include passive circuit elements, such as resistors and capacitors, and more complex, actively-controlled circuit elements which may provide logic and control functions. An example of an actively-controlled circuit element is a metal oxide semiconductor field effect transistor (MOSFET), which may be controlled to perform a switching function, e.g., turned on and off, or controlled in a linear fashion, e.g., voltage across the MOSFET or current flowing in the MOSFET may be controlled over a continuous range of values.

Circuit elements may be formed as regions of materials on a substrate as part of an integrated circuit. Alternatively, circuit elements may be commercially available as discrete passive and active devices mounted on a circuit board using conventional soldered leads or surface mounted contact pads.

Some circuit components may serve secondary services or functions for primary circuit components. For example, a power converter circuit may be considered a primary circuit, while a ripple filter component coupled to the output of the power converter may provide a secondary service function. Primary circuit components may be sold as commercial products, and service functions may be provided by components that are sold and mounted separately. Alternatively, one or more service functions may be included directly in a primary circuit component.

SUMMARY

The present disclosure describes techniques for adjusting the voltage across an active filter element to maximize transient load response and to minimize power dissipation.

In one aspect, an apparatus is disclosed that includes a controlled circuit element, and a control circuit element to control the voltage across the controlled circuit element to increase transient load response and to reduce power dissipation.

The above techniques may include adapting the control circuit element to increase transient load response by increasing the voltage across the controlled circuit element, so that when a change in the output or load impedance occurs, a nearly constant output or load voltage is maintained. The control circuit element can be adapted to decrease power dissipation by decreasing a voltage across the controlled circuit element as the current through the controlled circuit element increases.

The control circuit element can be adapted to maintain an output voltage of the controlled circuit element at a predefined level by providing a signal to a power converter circuit to adjust the output voltage of the converter. The control circuit element can be adapted to reduce undesirable voltage variations at the output of the controlled circuit element, the undesirable voltage variations being present at the input to the controlled circuit element. The controlled circuit element can include a MOSFET, and the voltage across the MOSFET can be controlled to be greater than the peak variation in ripple associated with an input voltage applied to the MOSFET.

In a second aspect, a method is disclosed that includes controlling the voltage across a controlled circuit element to increase transient load response and to reduce power dissipation.

The above techniques may include functions related to the aspects described above.

In a third aspect, an apparatus is disclosed that includes a controlled circuit element adapted to receive an input voltage, and a control circuit element adapted to monitor a load current through the controlled element and to adjust the voltage across the controlled circuit element based on the current through the controlled element. Such adjustment increases transient load response and reduces power dissipation of the controlled circuit element.

The above techniques may include functions related to the aspects described above.

In a fourth aspect, a method is disclosed that includes monitoring a load current through a controlled element, and adjusting the voltage across the controlled circuit element based on the current through the controlled element, wherein the adjustment includes increasing transient load response and reducing power dissipation of the controlled circuit element.

The above techniques may include functions related to the aspects described above.

In a fifth aspect, a system is disclosed that includes a power converter to provide an input voltage and a controlled circuit element adapted to receive the input voltage. The system also includes a control circuit element adapted to monitor a load current through the controlled element and to adjust the voltage across the controlled circuit element based on the current through the controlled element. Such adjustment increases transient load response and reduces power dissipation of the controlled circuit element.

The above techniques may include functions related to the aspects described above.

In a sixth aspect, a filter system is disclosed that includes two or more filter circuits coupled in parallel between an input terminal, an output terminal and a reference terminal. The filter circuits each supply a substantially equal current to a common external load.

In a seventh aspect, an apparatus is disclosed that includes a first circuit having an input, an output, a reference terminal, a series pass device connected between the input and the output, and a control circuit. The control circuit is operable to (a) sense a series current flowing through the series pass device and (b) control current in the series pass device. In some implementations, the control circuit includes a negative feedback loop to control an average power dissipation in the first circuit by comparing the series current with a signal at the reference terminal.

In an eight aspect, a method is disclosed that includes sensing a first current produced by a first filter circuit and adjusting the first current to substantially match a second current produced by a second filter circuit that is in parallel with the first filter circuit.

In some implementations, the disclosed systems and techniques may provide one or more of the following advantages. Active filters can include a linear MOSFET element connected between the output of a power converter and the load and an integrated circuit that actively controls the MOSFET to reduce ripple at the load. In such a circuit, the voltage across the active element is varied through the modulation of a control terminal, for example the gate terminal of a MOSFET. This modulation can be controlled by the output of a high-speed error amplifier, from for example 50 Hz to 2 MHz, in order to attenuate the undesirable ac components on the load voltage at the output of the filter. To provide the required near quiescent operating point for the active element, around which the voltage modulation takes place, a voltage headroom across the active filtering element can be set using a low speed control loop.

The disclosed techniques can handle tradeoffs between the filtering capability of the active filter system (i.e., attenuation of ac signal on a preferred dc voltage) and the voltage drop across the active filter element. The voltage drop across the active filter element may be directly proportional to wasted power in the form of impedance losses in the filter element. The techniques may optimize this tradeoff of attenuation and power dissipation by reducing the voltage across the active filter (or headroom) at high load current levels through the active filter element (and through the filter's output electronic load) consistent with a desired noise attenuation level.

In addition, these techniques may maximize the headroom across the active filter element at lower load currents, in order to increase the charge stored on the filter's input (i.e., across capacitors) to provide current to the load during short duration (e.g., 0.1 to 1000 micro-seconds) changes in the effective output load impedance (i.e., load step change). This may allow the voltage at the load to remain relatively constant through a brief (e.g., 0.1 to 1000 micro-seconds) change in its effective impedance.

These techniques also may include actively adapting the voltage across the filter element as a function of current through the active element (and the load). The adaptive headroom setting may be added to the action of other adaptive headroom functions, such as that due to the maximal ripple or noise amplitude. The active element can include a MOSFET capable of operating over a large frequency range such as for example 50 Hz to 10 MHz.

The details of one or more embodiments of the invention are set forth in the accompanying drawings and the description below. Other features, and advantages of the invention will be apparent from the description and drawings, and from the claims.

DESCRIPTION OF THE DRAWINGS

Like reference symbols in the various drawings may indicate like elements.

DETAILED DESCRIPTION

Figure 1A:
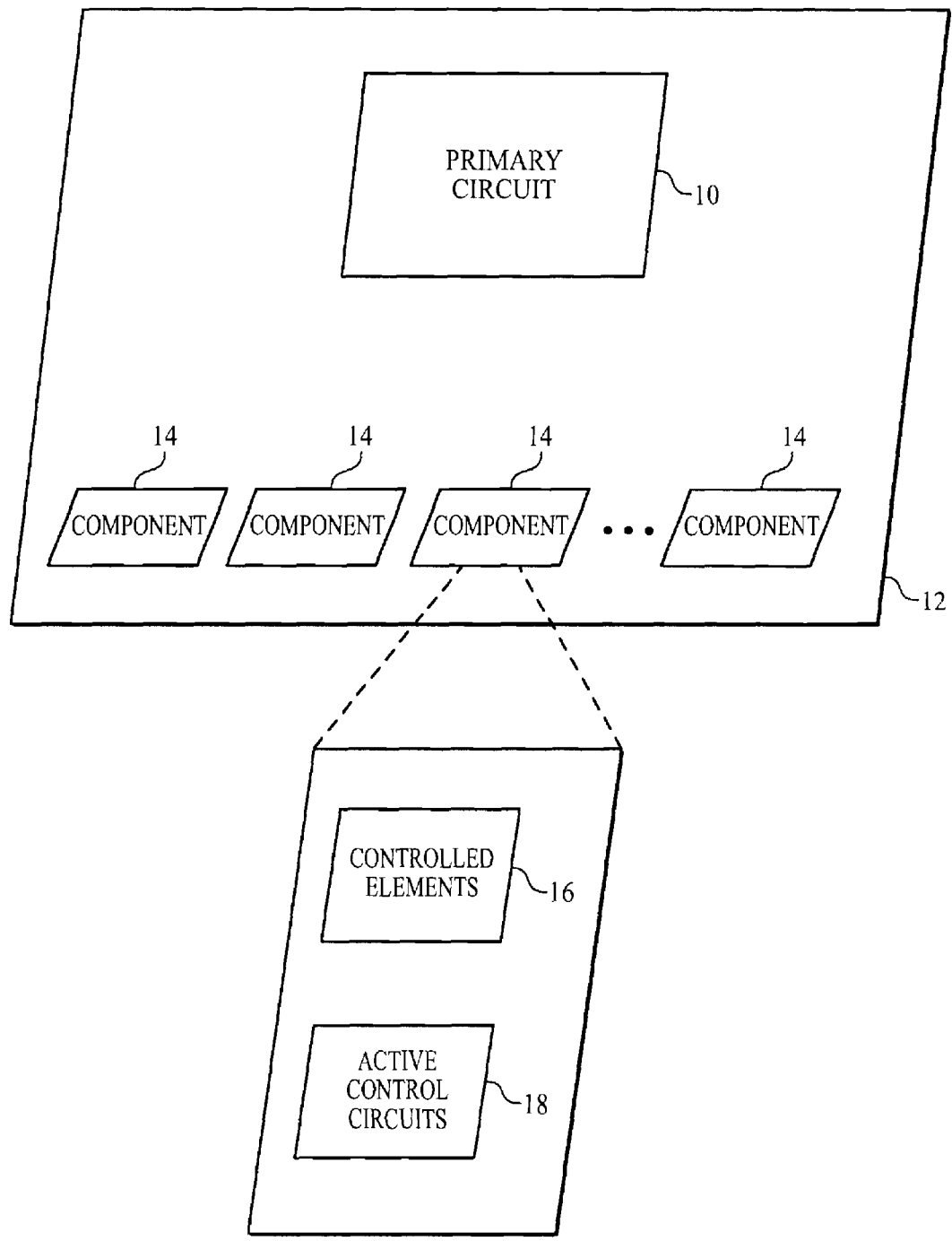
FIG. 1A illustrates a circuit, which may be implemented on a circuit board or as an integrated circuit.

FIG. 1A illustrates a circuit 12, which may be implemented on a circuit board or as an integrated circuit. A secondary circuit component 14 provides a secondary service or function for a primary circuit component 10 of the circuit 12. In this implementation, the secondary function is provided by a number of secondary circuit components 14 in parallel. Each secondary circuit component 14 includes a controlled element 16, which is controlled by a control circuit 18. The primary circuit component 10 may serve a wide variety of purposes, and the secondary circuit components 14 may provide a broad range of secondary functions or services to the primary circuit component 10.

Figure 1B:
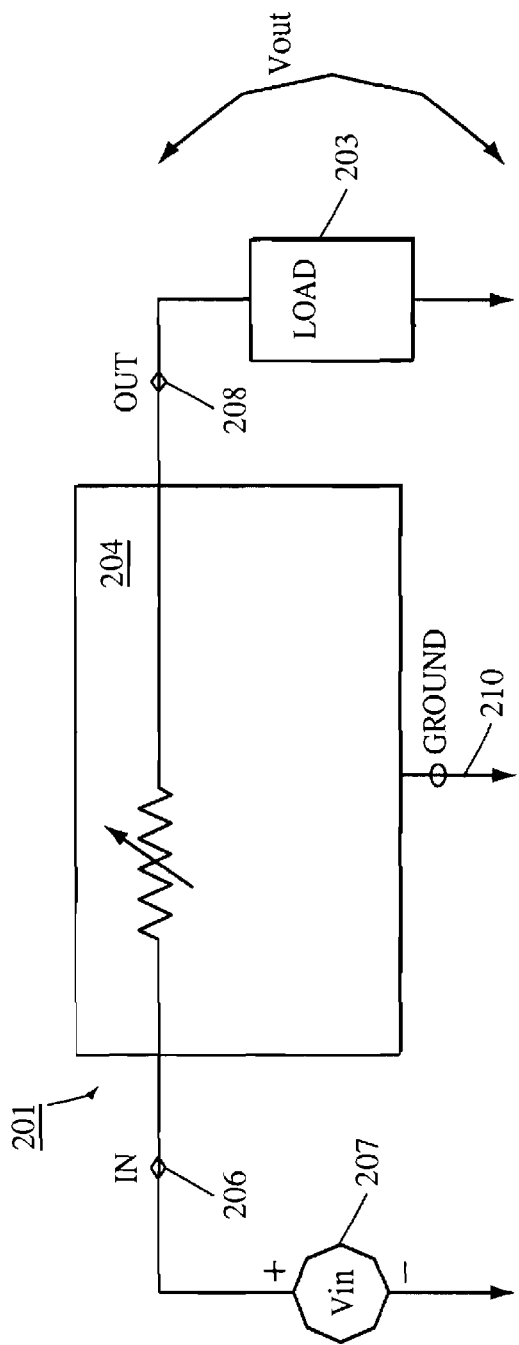
FIG. 1B illustrates a component which may be implemented in the circuit in FIG. 1A.

FIG. 1B illustrates a system 201, which may be implemented in the circuit 12 of FIG. 1A. The system 201 includes an idealized active filter element 204 with an input terminal 206 and an output terminal 208. The input terminal 206 is coupled to a non-ideal, input voltage source 207 (Vin). The output terminal 208 is coupled to a unipolar output load 203. Capacitance (not shown) may be coupled to the input terminal 206 of the filter element 204 to store charge. An output voltage Vout is present across an output load 203. A third terminal 210 of the filter element 204 is grounded.

Figure 1D:
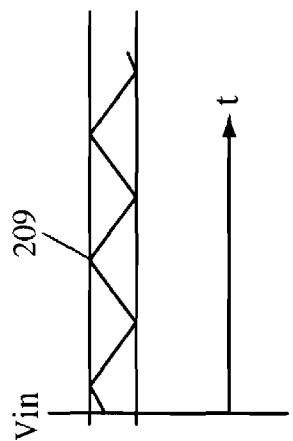
FIGS. 1C-1D illustrate an input voltage versus time and an output voltage versus time, respectively, of the component in FIG. 1B.
Figure 1C:

FIG. 1C illustrates an input voltage versus time, and FIG. 1D illustrates an output voltage versus time of the system 201 of FIG. 1B. The active filter element 204 reduces or prevents ripple voltage 209 generated by the input voltage source 207 from appearing in Vout at the load 203 by controlling an active element, such as a transistor, to offset the ripple 209. "Active filtering" refers to a filter circuit having an actively-controlled circuit element for implementing a filter function.

Figure 2:
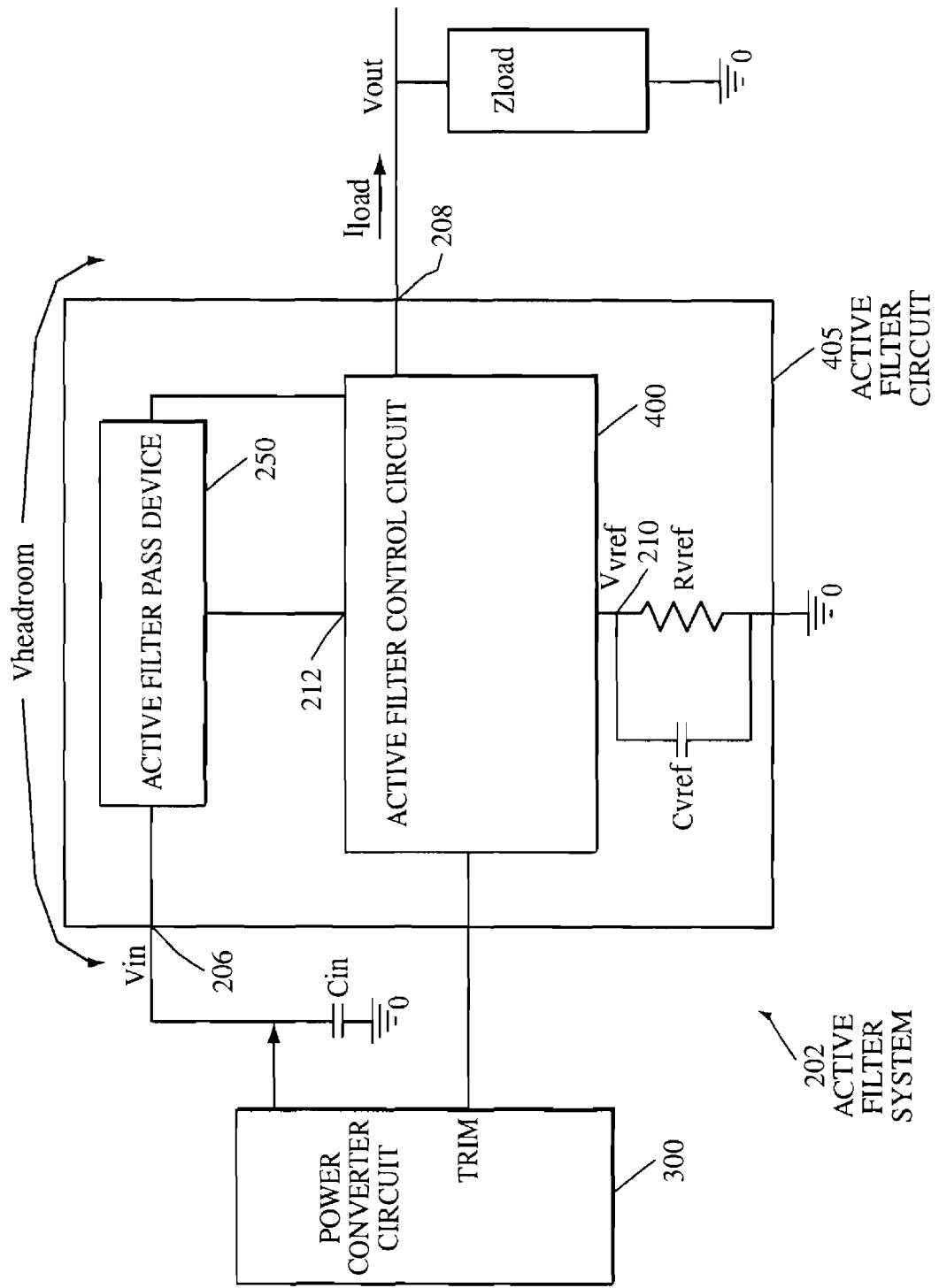
FIG. 2 illustrates an embodiment of the component in FIG. 1B.

As shown in FIG. 2, an active filter system 202 includes a power converter circuit 300 coupled to an input terminal 206 of an active filter circuit 405. An output terminal 208 of the active filter circuit 405 is coupled to an external load impedance (Zload), such as a circuit of resistors, inductors, capacitors and/or other elements.

A conventional DC-to-DC power converter may include ripple filtering circuitry. Certain applications may require very low ripple, and additional filtering requirements may be met by adding a filter component to the output terminal of the power converter. The active filter circuit 405 in FIG. 2 attenuates undesirable alternating current (AC) components (FIG. 1C) of the input voltage Vin from the power converter circuit 300 that is seen at the output Vout. The active filter circuit 405 does not appreciably affect the AC voltage component at Vin, rather the active filter circuit 405 reduces the resultant AC voltage component seen at Vout. The active filter circuit 405 delivers voltage Vout to the load impedance Zload. For example, in some implementations, the active filter circuit 405 may be able to reduce the amount of ripple present on input voltage Vin that is seen at the output Vout by approximately twenty to forty decibels.

The active filter circuit 405 in FIG. 2 includes one or more controlled elements, e.g., pass device 250, and control circuits 400 to provide filtering functions to a primary circuit 10 (shown in FIG. 1A). The controlled element may be an active filter pass device 250, such as a metal oxide semiconductor field effect transistor (MOSFET) or other type of controlled, active filter element. A control gate of the active filter pass device 250 is coupled to a first internal terminal 212 of the active filter control circuit 400.

The active filter circuit 405 includes a reference resistor (Rvref) connected to a second internal terminal 210, which is used to establish a reference voltage (Vref). Vref is also used to establish a set point for an output voltage (Vout) at the output terminal 208, as explained below.

The active filter control circuit 400 in the active filter circuit 405 controls the quiescent voltage across the active filter pass device 250. The quiescent voltage or operating point of the active filter circuit 405 may be referred to as a "headroom voltage" (Vheadroom), which may be defined as the average difference between input voltage Vin and output voltage Vout.

The active filter control circuit 400 responds to a decrease in load current Iload (current transferred to the external load Zload) by increasing the headroom voltage Vheadroom, which increases transient load response. The active filter control circuit 400 responds to an increase in load current Iload by decreasing the headroom voltage Vheadroom, which reduces or minimizes power dissipation of the pass device 250. Power dissipation, Pd, may be defined as approximately the product of the load current, Iload, (which is carried by pass device 250) and the headroom voltage, Vheadroom, across the active filter circuit 405.

The active filter system 202 also includes an input capacitor, Cin, capable of storing additional charge for subsequent additional load demand.

Vin is adjusted to maintain Vout at a desired level. The active filter control circuit 400 may include circuitry to control the output (Vin) of the power converter circuit 300. For example, the active filter control circuit 400 may include a trim control circuit (not shown) to monitor headroom voltage Vheadroom and send or provide a signal to a TRIM terminal (FIG. 2) of the power converter circuit 300 to adjust the output of the converter circuit 300 (i.e., input voltage Vin).

Figure 3:
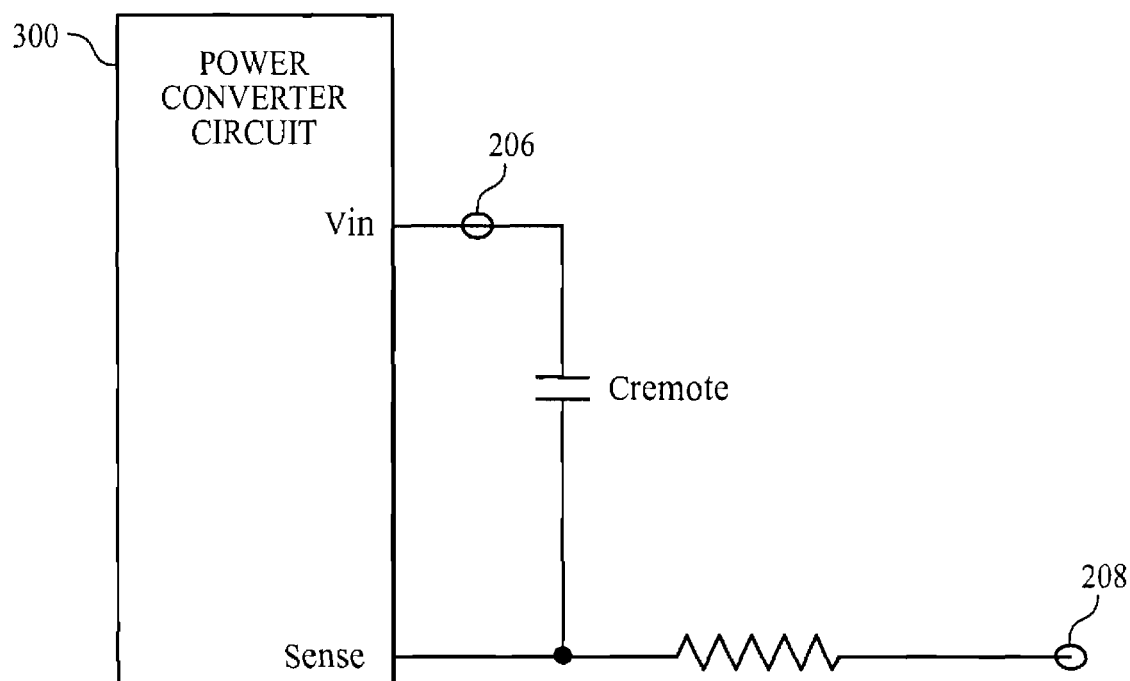
FIG. 3 illustrates a remote sense circuit.

Alternatively, FIG. 3 shows a remote sense circuit 501 which is capable of adjusting the output of the power converter circuit 300. The remote sense circuit 501 includes a resistor Rremote and a capacitor Cremote. The resistor Rremote is connected between Vout at Zload and a Sense terminal of the power converter circuit 300. The capacitor Cremote is connected between the Sense terminal and the converter output terminal 206.

Figure 4A:
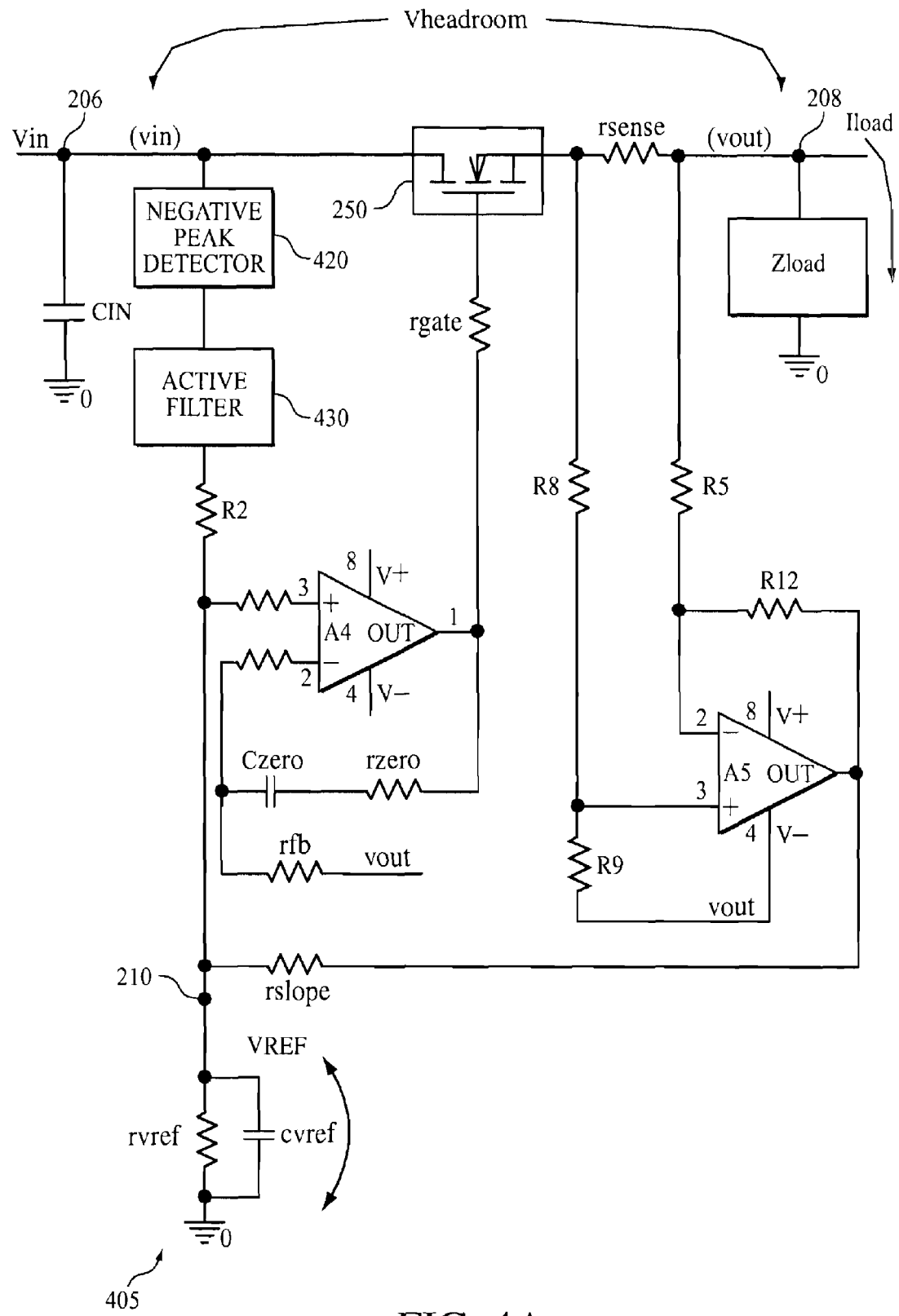
FIGS. 4A-4C illustrate filter circuits.

FIG. 4A is a circuit diagram of an active filter circuit 405 that includes an active filter 430 (e.g., a low pass filter) and passive filter elements including, for instance, resistor R2 and capacitor Cvref which derives a near direct current (DC) reference voltage Vref from input voltage Vin. The values of the components of the filter can be chosen based on the amount of ripple on voltage Vin to be reduced such as, for example, a reduction of forty decibels. The capacitor Cin stores additional stored charge such that the charge is available for subsequent additional load demand. Stored charge may also be available from the output capacitance of the converter circuit 300.

The active filter system 405 includes an amplifier A4 having an output to provide a voltage through resistor Rgate to drive pass device 250 to maintain load current and establish headroom Vheadroom based on reference voltage Vref. Amplifier can include an operational amplifier being powered using power pins V+ and V−. Amplifier A4 forces its input terminal voltages to be substantially equal by driving its output to a level to which pass device 250 pulls output voltage Vout to reference voltage Vref. For example, if voltage Vref is set to +11.5 volts, then, in the illustrated implementation, amplifier A4 drives pass device 250 to produce an output voltage Vout of +11.5 volts. The amplifier A4 includes a feedback compensation network comprising capacitor Czero, resistor Rzero and resistor Rfb for providing loop stability in conjunction with amplifier A4.

The amplifier A4 sums inputs from the negative peak detector 430. The peak detector 430 receives input voltage Vin, detects the negative peak of ripple voltage Vpeak_Ripple that may accompany voltage Vin and generates an output voltage Vpeak_Out. Vpeak_Out is determined by:

$$V\text{peak\_Out}=[(V\text{in})-(V\text{peak\_Ripple})].$$

For example, if voltage Vin is +12 volts and Vpeak_Ripple is +/−0.2 volts, then Vpeak_Out could be 11.8 volts. The reference resistor Rvref sets a current from Vref to ground which equals Vout/Rref.

When load current Iload is zero, current demand established by Rvref is satisfied solely by current from the negative peak detector 430 creating a voltage drop across resistor R2. This voltage drop sets the headroom voltage across pass device 250 at low levels of current. Voltage Vheadroom is determined by:

$$V\text{headroom}=(V\text{out}/R\text{vref})*R2+V\text{peak\_out}.$$

For example, if headroom voltage Vheadroom is set to 0.3 volts and output voltage Vout is 12 volts, then, assuming that resistor R2 is 2.5 k ohms, resistor Rvref should be about 100 k ohms. Therefore, at low levels of current Iload, such as 1 picoamp through pass device 250, headroom voltage Vheadroom would be the sum of 0.3 volts and 0.2 volts (which is equal to the voltage Vin peak ripple voltage) for a total of 0.5 volts of headroom voltage Vheadroom.

If load current Iload increases, amplifier A5 delivers a current into the node Vref proportional to the current Iload, thereby reducing the current demand on Vpeak_Out. Load current Iload flows through resistor Rsense having a value of, for example, 2 milli-ohms. The load current Iload causes a voltage to be developed across resistor Rsense which is fed to difference amplifier A5 and multiplied by the gain of amplifier A5 (Gain_A5). The gain of amplifier A5 is defined as R12/R5. For example, if resistor R12 is 250 k ohms and resistor R5 is 10 k ohms, the gain of amplifier A5 (Gain_A5) would be 25.

Since amplifier A5 is referenced to output voltage Vout, the voltage between the output of amplifier A5 and output voltage Vout is proportional to load current Iload. This differential voltage is fed to terminal 210 through resistor Rslope. The gain of the amplifier A5 (Gain_A5) helps sets the change in headroom voltage for a given change in load. The change is Vheadroom is defined by:

$$V\text{headroom\_delta}=R\text{sense}*\text{delta\_}I\text{load}*(R2/R\text{slope})\\*\text{Gain\_}A5.$$

For example, assuming 0.3 volts for Vheadroom under low current load Iload conditions has been established by Rvref and a minimum of 0.1 volts for headroom voltage Vheadroom is required (to achieve desired attenuation at full load), then the difference between 0.3 and 0.1 volts provides 0.2 volts for Vheadroom_delta. Assuming further that Iload is expected to increase by, for example, 10 amps, resistor R2 is 2 k ohms, resistor Rsense is 2 milli-ohms and Gain_A5 is 25, then resistor Rslope should be about 6.2 k ohms.

Figure 4B:
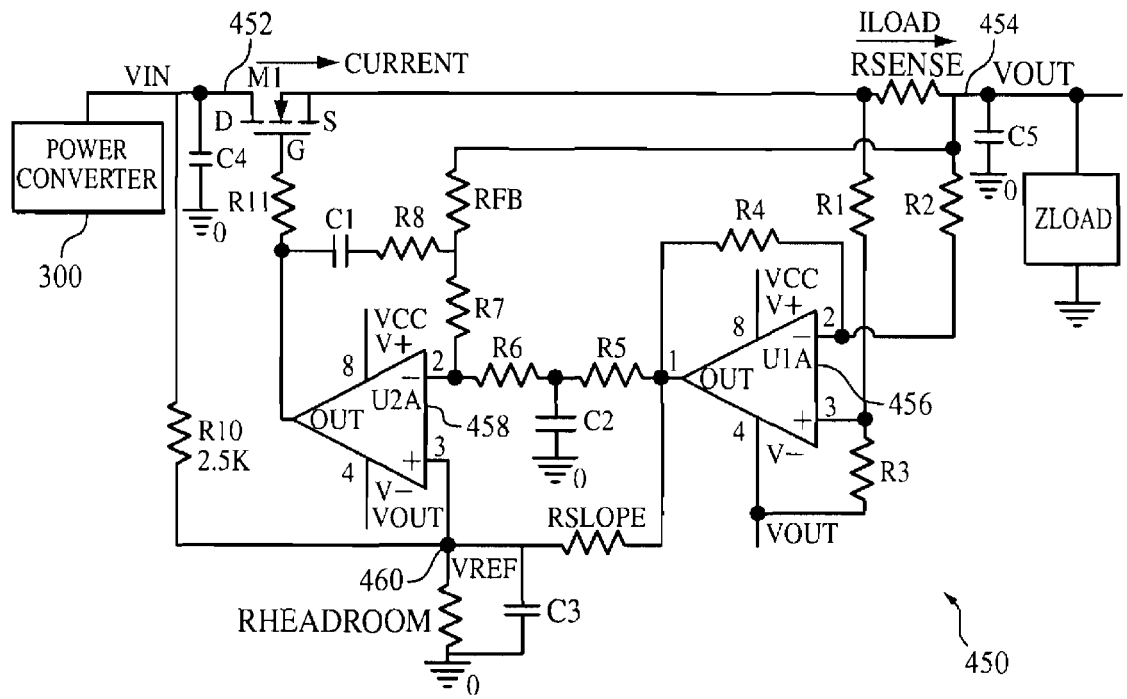

The active filter system 405 of FIG. 2 may also be implemented as illustrated in FIG. 4B. The filter circuit 450 is a quiet power output (QPO) filter, which adjusts to dissipate relatively constant power and eliminates ripple, which was introduced by the input voltage Vin, as seen at the output Vout. The filter circuit 450 includes an input terminal 452 for receiving an input voltage, Vin, an output terminal 454 for delivering an output voltage, Vout, and a reference terminal 460 for setting and/or monitoring a reference voltage, Vref. The filter circuit 450 also includes a first amplifier 456, a second amplifier 458, a series pass device M1, a sense resistor, Rsense, a slope resistor, Rslope, a feedback resistor, RFB, other resistors R1, R2, R3, R4, R5, R6, R7, R8, Rheadroom, R10 and R11, and capacitors, C1, C2, C3, C4, C5.

As an example, the series pass device M1 may be a transistor, such as an n-channel enhancement type MOSFET. The first and second amplifiers may be operational amplifiers (op amps).

As discussed above, filter power dissipation may be reduced by lowering the headroom voltage in response to increased load current. Resistor, Rslope, may be chosen to set the slope of the filter's change in headroom voltage as a function of changes in load current. For example, the headroom voltage may be decreased by 150 mV in response to an increase in load current of 10 Amps. Rslope may be calculated using the following:

$$Rslope=[(-a)(R10)(Rheadroom)+(R10)(Rheadroom)]/[(\Delta VHR/\Delta Vi)(Rheadroom)+a(R10+Rheadroom)]$$

where $$a=(R7+RFB)/(R7+RFB+R5+R6)$$

$$\Delta Vi=(\Delta I)(Rsense)(R3/R1)$$

Rslope=1.789 kohms

With Iload=0, Vout=Vref+Vos (amplifier 458A's input offset voltage), and therefore Vheadroom is approximately equal to (Vout/Rheadroom)×R10. Resistor Rheadroom is used to set the headroom voltage at no load and is therefore referred to as Rheadroom in the above equations. Referring to FIG. 5E, Rslope as a function of Rheadroom does not change much for very large changes in Rheadroom. For example, variation of Rheadroom from 30 kohms to 300 kohms yields a calculated Rslope of 1.79 to 1.82 kohms. Therefore, Rslope may be selected first, and then Rheadroom may be changed to adjust the output voltage without necessitating an adjustment or recalculation of Rslope. Rheadroom is used to set Vheadroom. Other circuitry, either internal to the filter circuit 450 which acts upon a converter's "TRIM" or an external "remote sense" (FIG. 3) actually maintains the desired Vout.

RFB may be about 60 ohms. Rsense may be about 2 milliohms. R1 may be about 25 kohms. R3 may be about 250 kohms. R5 may be about 1 kohm. R6 may be about 2 kohms. R7 may be about 1 kohm. R10 may be about 2.5 kohms. R2 may be about 25 kohms. R4 may be about 250 kohms. R8 may be about 100 ohms. R11 may be about 10 ohms. Other resistance values may be used in other embodiments.

Bias voltage Vcc to each differential amplifier 456, 458 in FIG. 4B may be supplied by a built-in boost circuit, e.g., an inductive, non-isolated boost regulator or a switched capacitor boost circuit, which receives input voltage Vin and generates a voltage Vcc greater than the input voltage Vin. The V– (Vee) terminal of each amplifier 456, 458 may be connected to the output terminal 454 with output voltage Vout. In the filter circuit 450, a circuit may monitor the voltage difference between VCC and Vin and trigger a boost regulator to maintain this difference to some internally or externally programmable level (e.g., near 7.5 V).

The current sense resistor Rsense is preferably on the output side of the filter circuit 450 so that the drain D of the transistor M1 may be connected directly to a pad of a package (preferably a system in a package) to facilitate heat removal.

It may be preferable to integrate the filter circuit 450 into a three terminal device. For maximum versatility, the slope resistor Rslope and Rheadroom may be external to the three terminal device.

The capacitor C1 and resistor R8 may act as compensation to reduce the gain of the second amplifier 458 at high frequencies for stability.

In many applications it may be desirable to couple multiple filter circuits in parallel to handle large load currents. For example, a load current of 100 Amps may be filtered by connecting ten filter circuits (each capable of handling up to a 10 Amp load) in parallel.

One problem with connecting filter circuits in parallel is that very small differences in component characteristics, such as the input offset voltage or current, or the gain of one or more of the amplifiers, may cause one filter circuit to carry a disproportionate share of the load current. In high current load sharing applications, i.e., where many filter circuits may be connected in parallel, disproportionate sharing in the load could result in failure or destruction of the filter.

In accordance with one embodiment of the present disclosure, any number of filter circuits may be coupled in parallel to equally share in carrying a load current without an external controller.

Figure 4C:
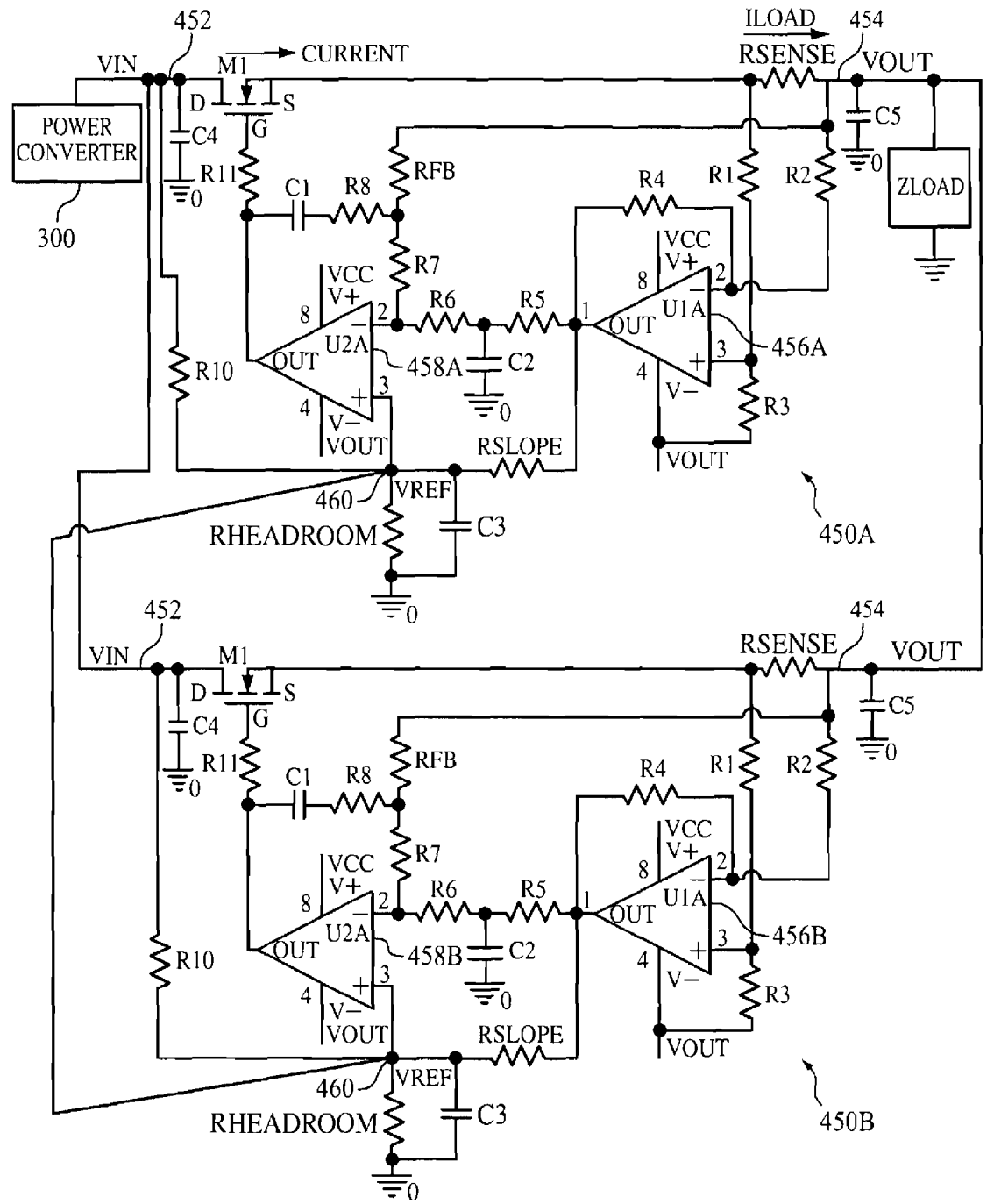

FIG. 4C illustrates a load sharing circuit with two identical filter circuits 450A, 450B coupled in parallel to an input terminal (power source) 452, an output terminal (load impedance Zload) 454 and a reference voltage terminal 460. Each filter circuit 450 is a three-terminal device. Vin, Vout and Vref will be the same for both filter circuits 450A, 450B. The two filter circuits 450A, 450B incorporate internal negative feedback circuitry that causes each filter circuit 450 to share equally in the load current as explained below. Thus, a system may be designed with two or more filter circuits 450A, 450B supplying a total load current that is equal to two or more times the current handling capability of one filter circuit 450.

In each filter circuit 450, resistors R1 and R2 are much larger than resistor Rsense. Rsense therefore provides a measure of the load current being carried by the individual filter circuit 450 and supplied to its respective output terminal 454. A first amplifier 456 amplifies the sensed load current signal and provides an output signal to the second amplifier 458. The voltage sensed by the difference amplifier circuit (comprised of resistors R1-R4 and amplifier 456) is Vrsense=Iload× Rsense, which is amplified by a gain of R3/R1 and provided as a voltage between pin1 of amplifier 456 and Vout.

The output current from the first amplifier 456 may be fed to the inverting input of the second amplifier 458 via the path with resistors R5, R6 and capacitor C2 and to the non-inverting input (of the second amplifier 458) via the path with resistors Rslope, Rheadroom and capacitor C3. The RC filter comprised of resistors R5, R6 and capacitor C2 may be selected to match the RC time constant of a second RC filter comprised of resistor Rslope, resistor Rheadroom and capacitor C3, such that rapid changes in load current appear as a nearly pure common mode signal at the inverting and non-inverting inputs of the second amplifier 458. These RC filters also prevent the filter circuit 450 from rapidly acting upon sensed instantaneous changes in load current. In the instance of a single filter circuit 450, amplifier 456 serves only to adjust the average headroom voltage across the filter circuit 450 (via porting current through Rslope to Vref and altering the demand for current through resistor R10. In addition, with Iload>0 A, Vpin1 of the first amplifier 456 will be greater than Vout, and therefore current will flow through resistors R5, R6, R7 and Rfb. The resultant offset voltage created across the input terminals of the second amplifier 458 will be canceled by an adjustment of Vin through one of the previously described feedback mechanisms to the power source 300. If two filter circuits 450A, 450B were coupled in parallel, the current through Rfb and the resultant differential voltage change seen by the input pins of the second amplifier 458 would cause the second amplifier's output voltage of the filter circuit 450 that had the higher share of the load current to fall and thereby reduce the current through its associated M1 pass device. Changes in load current are accommodated by sensing the resultant changes in Vout and adjusting the power source 300 to alter Vin through the mechanisms described above.

The differential input signal to the second amplifier 458 is substantially a comparison of the output voltage Vout and the reference voltage Vref. This feedback path (RFB) is used to provide the filter function, and therefore has a greater bandwidth than the load-sharing feedback path. Average increases (or decreases) in the load current Iload increases (or decreases) Irslope (as a result of pin1 of amplifier 456 changing) which increases (or decreases) current IR10, which causes an increase (or decrease) in Vref, thereby reducing (or increasing) Vheadroom. As Vheadroom changes, Vout would tend to change, but feedback to the power converter 300 accommodates this change by altering Vin. The decrease in headroom voltage at high loads reduces power dissipation while increasing the headroom at low loads augments the transient response to changes in load current.

The filter circuits 450A, 450B in FIG. 4C are connected in parallel and share the same input terminals 452, output terminals 454, and reference voltage terminals 460. The reference voltages Vrefs are therefore forced to track each other. The voltage at the inverting pins of the amplifiers 458A, 458B, however, are not forced to track. The current through resistor RFB and the resultant differential voltage change seen by the second amplifier 458 cause amplifier 458's output voltage to fall and thereby reduce the current through its associated M1 pass device. The current sense negative feedback path therefore causes the filter circuits 450A, 450B to automatically share equally in the load current. The current across resistor Rsense may be sensed and controlled to be substantially equal in both filter circuits 450A, 450B. Average power dissipation may be substantially similar in both filter circuits 450A, 450B.

The resistor Rheadroom may be external to each filter circuit 450. Resistor R10 may be internal or external. If R10 is internal to the filter circuit 450, an additional Rheadroom may be added for each filter circuit 450 so that the ratio of Rheadroom to R10 does not change. The effective value of Rheadroom may decrease as filter circuits 450 are added in parallel because internal R10 is also paralleled.

Each filter circuit 450 may be configured to avoid responding to changes or fluctuations in external load current.

R5, R6 and Rslope may make headroom voltage increase, decrease or stay constant with increasing load current.

If the current through Rsense in the first filter circuit 450A rises above the current through Rsense in the second filter circuit 450B, then the first Vrsense will be greater than the second Vrsense. The first amplifier 456A of the first filter circuit 450A effectively multiplies the first Vrsense minus the second Vrsense by a voltage gain of R3/R1. This amplified voltage is seen at the output of the first amplifier 456A with respect to Vout. This causes an increase in current flow from the first amplifier 456A, which may be divided proportionately between R5 and Rslope. The net effect of the increased current through Rslope upon the distribution of load current in the two filter circuits 450A, 405B may be negated because this current is fed into Vref, which is common to both. The increased current in R5 and R6, however, raises the voltage seen by the inverting input pin of the second amplifier 458A of the first filter circuit 450A. This lowers the second amplifier's output voltage, increases M1's impedance and reduces current through the transistor M1 of the first filter circuit 450A.

R5 and C2 may serve as an RC filter to slow the effects of the current change and minimize noise seen at the second amplifier's inverting input pin. Rslope may reduce the voltage across the transistor M1 (drain to source) as current increases to minimize power dissipation.

Other aspects of the filter circuit 450 in FIG. 4B are now described. The capacitor C3 may derive a near direct current (DC) reference voltage Vref from the input voltage Vin. The capacitor C4 may store additional charge for subsequent additional load demands. Stored charge may also be available from output capacitance of the converter circuit 300.

The second amplifier 458 forces its input terminal voltages to be substantially equal by driving its output to a level to which the transistor M1 pulls output voltage Vout to reference voltage Vref. For example, if voltage Vref is set to +11.5 volts, then the second amplifier 458 drives the transistor M1 to produce an output voltage Vout of +11.5 volts. The second amplifier 458 includes a feedback compensation network comprising capacitor C1, resistor R8 and resistor RFB for providing loop stability in conjunction with the second amplifier 458.

FIGS. 5A to 5D are plots illustrating operation of the active filter circuit 405 of FIG. 2. In particular, FIGS. 5A-5D illustrate how the active filter circuit 405 decreases headroom voltage Vheadroom as current Iload increases through the pass device 250. As a result, the active filter circuit 405 may maximize transient load response and minimize power dissipation across the pass device 250.

Figure 5A:
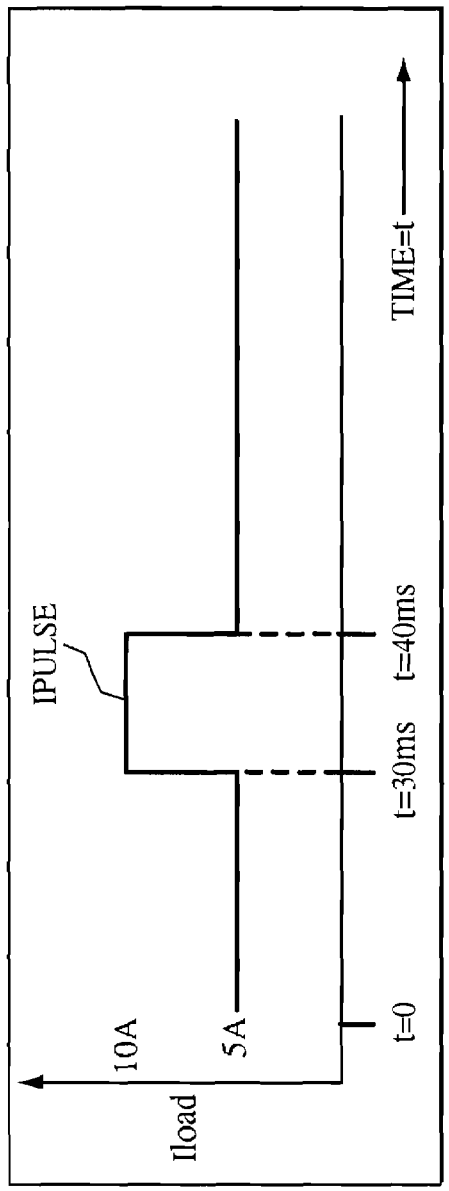
FIGS. 5A-5D are voltage and current plots of an active filter circuit.
Figure 5B:
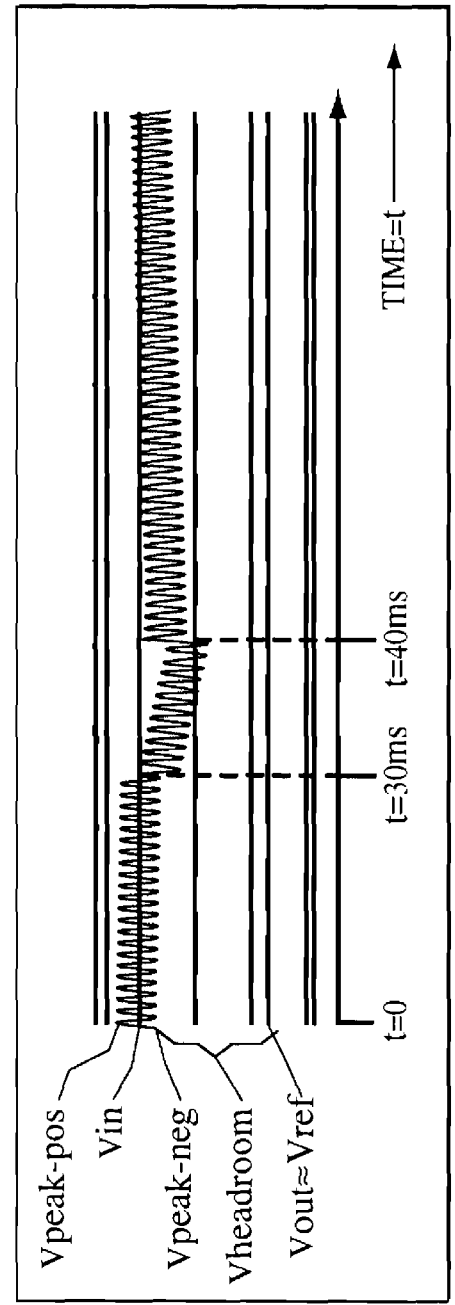

FIG. 5A shows a plot of load current Iload along the y-axis and time t along the x-axis. FIG. 5B shows a plot, along the y-axis, of input voltage Vin having a positive peak voltage Vpeak_pos and a negative peak voltage Vpeak_neg, reference voltage Vref, output voltage Vout, and Vheadroom being the difference between Vpeak_neg and Vout. FIG. 5B shows time t along the x-axis.

At time t=0, FIG. 5A shows Iload equal to a relatively low value of current, for example, 5 amps. Also at t=0, FIG. 5B shows Vin having a DC voltage component and AC components of Vpeak_pos and Vpeak_neg, Vheadroom being the difference between the average Vin and Vout, and Vout being approximately equal to Vref. The active filter circuit 405 is able to drive output voltage Vout to a value set by Vref as well as establish the voltage Vheadroom across pass device 250. The active filter circuit 405 may attenuate ripple voltage represented by Vpeak_pos and −Vpeak_neg by approximately forty decibels.

At t=30 milliseconds (ms), FIG. 5A shows load current Iload as it increases to the value Ipulse (e.g., approximately 10 amps) for approximately 10 ms until t=40 ms when Iload returns to its original value of 5 amps. At t=30 ms, FIG. 5B shows that voltage Vin decreases as a result of current Ipulse for a duration of 10 ms. However, the active filter circuit 405 maintains output voltage Vout at the reference level Vref despite an increase in Iload and resultant reduction in voltage Vin.

By providing additional headroom voltage Vheadroom at current less than its maximum rated load current for the active filter circuit 405, the circuit 405 is able to provide additional stored charge across the input capacitance, Cin in FIG. 2. The stored charge is available to provide additional load current, especially during short time periods (e.g., in the range about 0.1 to 1000 microseconds) due to transient changes in the effective load impedance Zload. This may allow the active filter circuit 405 to maintain a nearly constant voltage across Zload, even under conditions of changing Zload. For example, increasing voltage Vheadroom from 0.2 to 0.5 volts may allow circuit 400 to handle these transient conditions.

In addition, the circuit 405 may be able to reduce Vheadroom to accommodate a longer term (e.g., time greater than 1000 microseconds) increase in Iload to minimize power dissipation. At low levels of operation, such as Iload being 5 amps and Vheadroom being 0.4 volts, power dissipation would be 2 watts. However, when load current Iload increases to 10 amps, the circuit 400 may reduce Vheadroom from 0.4 volts to 0.2 volts so as to maintain the power dissipation Pd of about 2 watts, approximately the same value of power dissipation at low levels of operation. This may permit the optimization of the design of systems using active filters, permitting reduced power dissipation to maintain an acceptable maximal temperature of the active filter and surrounding components.

Figure 5C:
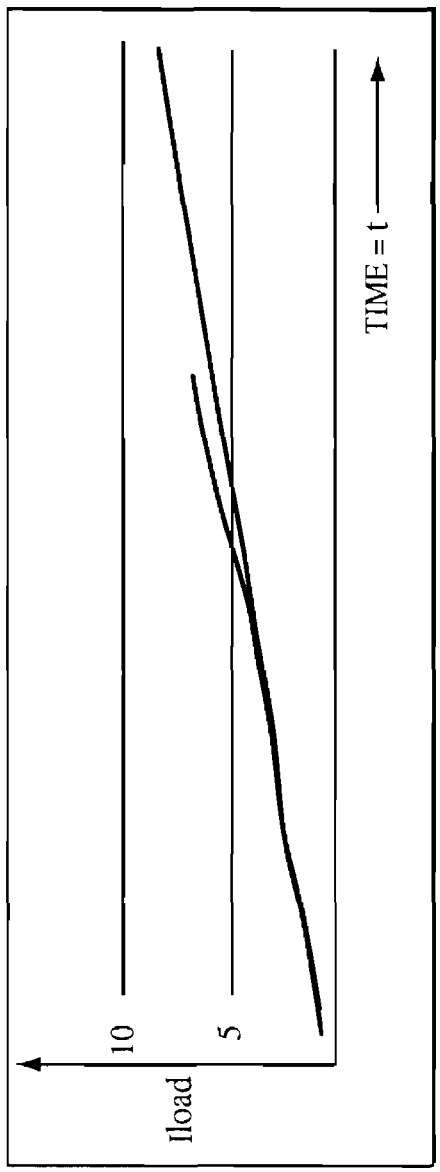
Figure 5D:
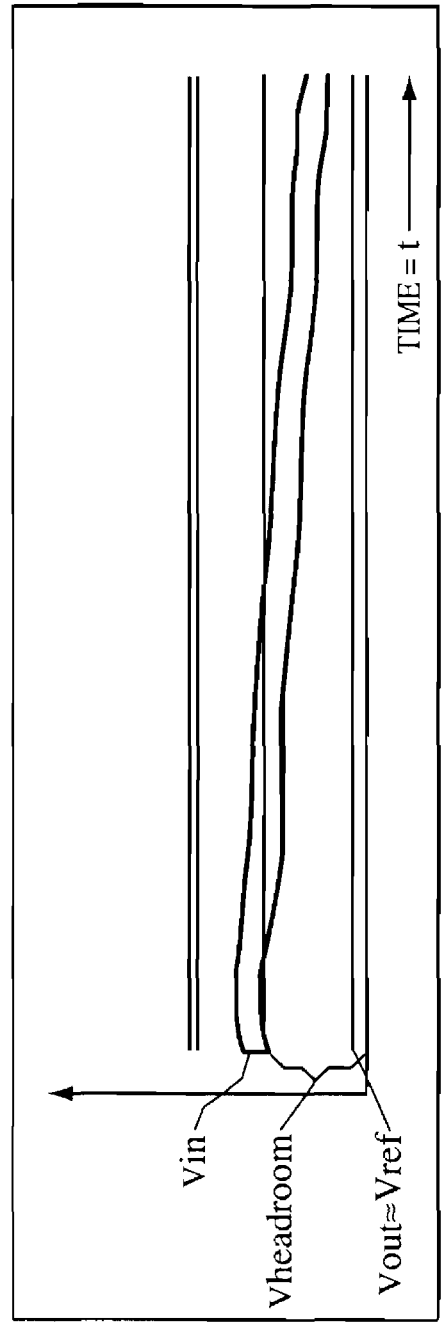
Figure 5E:
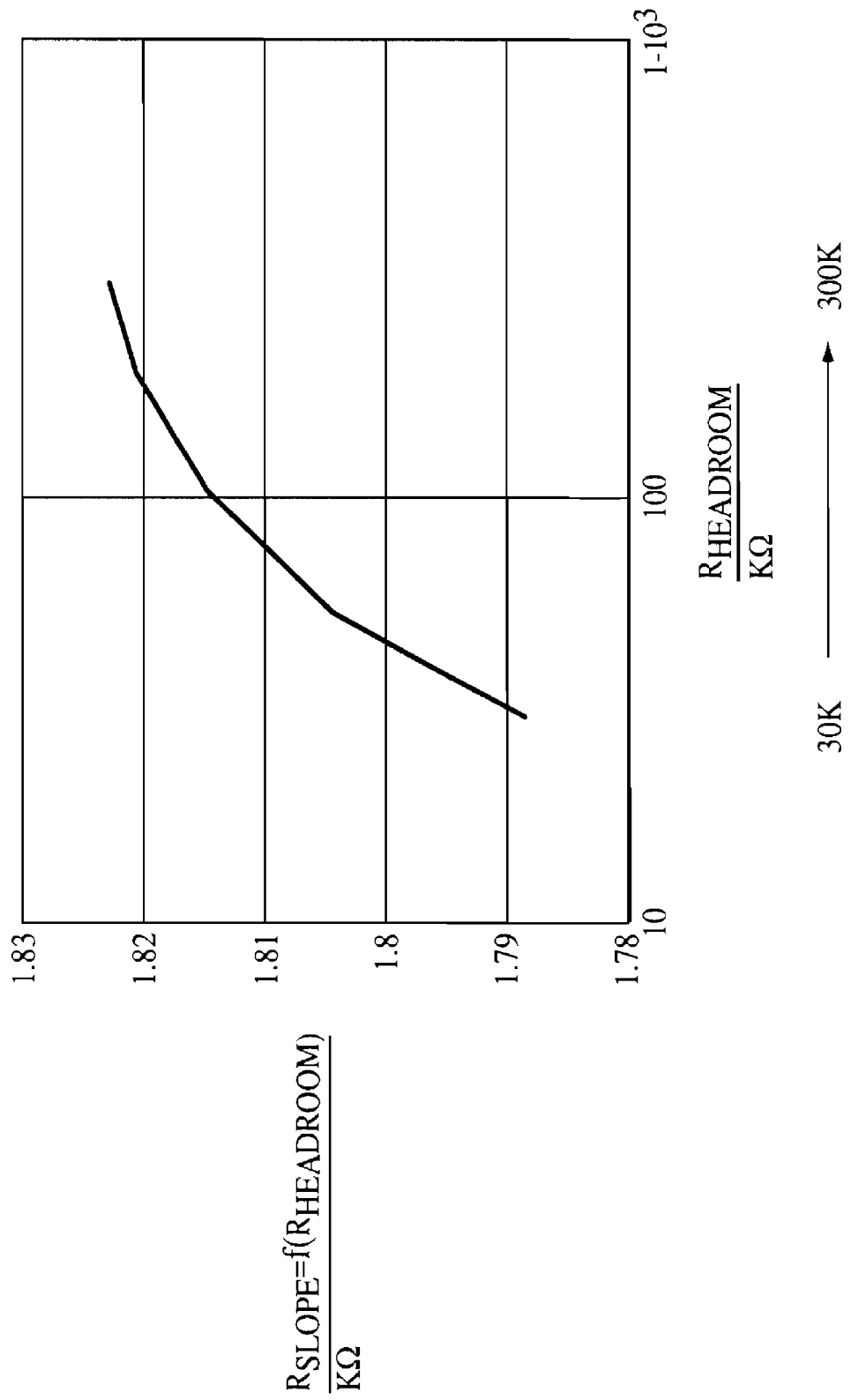
FIG. 5E shows a headroom resistance in parallel with a slope resistance versus the headroom resistance.

FIGS. 5C and 5D shows plots similar to FIGS. 5A and 5B, except that FIGS. 5C and 5D show the response of the filter circuit 405 to a smooth and linear increasing load current Iload instead of the sudden increase in Iload shown in FIG. 5A. Referring to FIG. 5D, Vheadroom decreases in response to increases in Iload through pass device 250, thereby maximizing transient load response and minimizing power dissipation across the pass device.

The techniques described above are not limited to the above implementation. A parallel filter system may use other types of filters, series regulators or active filters in parallel to increase a filter circuit's capacity to provide load current. Other implementations may include, for example, active input or active output filters for switching power supplies, active filters for the input or output of AC-DC converters, active filters for AC-AC transformers or active filters used with linear or other non switching power supplies or filters used at a distance from a power converter among others.

Other implementations are within the scope of the following claims.

What is claimed is:

1. An apparatus comprising:
 a circuit adapted to be connected in parallel with a similar circuit to adjust a load current, the circuit comprising:
  an input terminal for receiving an input voltage from a source;
  a first amplifier to sense the load current; and
  a second amplifier to generate a control signal to adjust the load current, wherein an output of the first amplifier is coupled to first and second signal paths, the first signal path being coupled to a first input of the second amplifier, the second signal path being coupled to a second input of the second amplifier, wherein the first and second signal paths are portions of a feedback mechanism that enables the voltages at the first and second inputs of the second amplifier to change in response to a change in the load current through the circuit, wherein the second input of the second amplifier is coupled to a reference terminal in common with one or more parallel circuits, and the reference terminal has a voltage that is derived from the input voltage.

2. The apparatus of claim 1 further comprising a series pass device controlled by an output of the second amplifier.

3. Apparatus comprising:
 a power sharing array having a common input terminal for receiving power from a power source; a common output terminal for delivering a load current and a load voltage to a load; and a common reference terminal;
 the array including a plurality of N first circuits, where N is an integer greater than 1;
 each first circuit comprising an input for receiving power from the power source, an output for supplying an output voltage and an output current to the load, a control circuit for controlling a headroom voltage defined as the voltage difference between the input and the output, and a controlled circuit element connected between said input and said output and configured to provide said output current, wherein the control circuit is coupled to said input and said output and configured to compare the headroom voltage to a reference signal and output a signal to the controlled circuit element to adjust the headroom voltage, wherein adjusting the headroom voltage comprises decreasing the headroom voltage in response to an increase in the output current; and further comprising a reference terminal for receiving a reference signal;
 wherein the input of each first circuit is connected to the common input terminal, the output of each first circuit is connected to the common output terminal, and the reference terminal of each first circuit is connected to the common reference terminal; and
 wherein the control circuit is constructed and arranged to automatically set the output current of its respective first circuit to an equal share, 1/N, of the load current.

4. The apparatus of claim 3 wherein each of the first circuits is constructed and arranged to adjust the headroom voltage as a function of the reference signal.

5. The apparatus of claim 3 wherein each first circuit is constructed and arranged to adjust the reference signal at the reference terminal as a function of its respective output current.

6. The apparatus of claim 3 wherein:
 each of the first circuits is constructed and arranged to adjust the headroom voltage as a function of the reference signal and to adjust the reference signal at the reference terminal as a function of its respective output current.

7. The apparatus of claim 3 wherein:
 a resistance is connected to the common reference terminal;
 the first circuits are constructed and arranged to output a reference current to the reference terminal as a function of its respective output current;
 the reference currents from the first circuits are summed by the common reference terminal and a reference voltage is developed at the common reference terminal;
 the reference signal is the reference voltage; and
 the first circuits are constructed and arranged to adjust the headroom voltage as a function of the reference voltage.

8. The apparatus of claim 7 wherein the reference currents are also as a function of the output voltage.

9. Apparatus comprising:
 a first circuit having:
  an input terminal for receiving an input voltage from a source;
  an output terminal for supplying an output voltage and an output current to a load;
  a reference terminal for connecting to a circuit external to the first circuit; and
  a controller;
 wherein the first circuit is constructed and arranged to develop a headroom voltage defining a voltage difference between the input and output terminals, and the controller includes circuitry to
  compare a controlled voltage to a voltage at the reference terminal derived from the input voltage,
  adjust the comparing as a function of a current flowing between the input and output terminals, and
  adjust, in response to the adjusted comparing, an impedance between the input and output terminals in direct relation to changes in the current flowing between the input and output terminals;
 wherein the circuitry is adapted to set the output current of the first circuit to a level equal to a total current delivered to the load divided by a number N of first circuits connected in parallel to supply the total current, the first circuit being among the N first circuits.

10. The apparatus of claim 9 wherein the first circuit comprises exactly three terminals for making electrical connections to the first circuit: the input terminal, the output terminal, and the reference terminal.

11. The apparatus of claim 9 wherein the controlled voltage is dependent on the output voltage.

12. A method comprising:
   providing a number N of filter circuits connected in parallel to deliver a total current to a load, each of the N filter circuits receiving an input voltage from a respective filter input and delivering a filter output current from a respective filter output and having a respective reference terminal connected to a common reference;
   wherein each of the N filter circuits comparing a controlled voltage to a voltage at the common reference terminal derived from the input voltage, adjusting the comparing as a function of current flowing between its respective filter input and filter output, and in response to the adjusted comparing, adjusting an impedance between its respective filter input and filter output in direct relation to changes in the current flowing between its respective filter input and filter output terminals, adjusting its respective filter output current to substantially match the filter output current delivered by the other filter circuits.

13. The method of claim 12, further comprising
   developing an impedance in each of the N filter circuits between its respective filter input and filter output; and
   each of the N filter circuits increasing its respective impedance when its respective output current is higher than the output current divided by N.

* * * * *

UNITED STATES PATENT AND TRADEMARK OFFICE
CERTIFICATE OF CORRECTION

| | | |
|---|---|---|
| PATENT NO. | : 7,944,273 B1 | Page 1 of 1 |
| APPLICATION NO. | : 12/143364 | |
| DATED | : May 17, 2011 | |
| INVENTOR(S) | : Patrizio Vinciarelli, Michael Briere and Jeffrey Gordon Dumas | |

It is certified that error appears in the above-identified patent and that said Letters Patent is hereby corrected as shown below:

Title Pg, Item (56) under OTHER PUBLICATIONS, line 2, delete "Conferecne;" and insert -- Conference; --.

Signed and Sealed this
Twelfth Day of July, 2011

David J. Kappos
*Director of the United States Patent and Trademark Office*